(12) United States Patent
Kissa et al.

(10) Patent No.: US 8,996,984 B2
(45) Date of Patent: Mar. 31, 2015

(54) AUTOMATIC VISUAL PREVIEW OF NON-VISUAL DATA

(75) Inventors: Peter Kissa, Ossining, NY (US); Zhen Wen, Chappaqua, NY (US); Qiang Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/769,952

(22) Filed: Apr. 29, 2010

(65) Prior Publication Data

US 2011/0271174 A1 Nov. 3, 2011

(51) Int. Cl.
*G06F 3/048* (2013.01)
*G06Q 10/10* (2012.01)

(52) U.S. Cl.
CPC ....................................... *G06Q 10/10* (2013.01)
USPC ............................. 715/230; 715/738; 715/772

(58) Field of Classification Search
CPC ...................................................... G06Q 10/10
USPC ........................................ 715/230, 738, 772
See application file for complete search history.

(56) References Cited

U.S. PATENT DOCUMENTS

| | | | |
|---|---|---|---|
| 5,029,107 A | 7/1991 | Lee | |
| 5,841,512 A | 11/1998 | Goodhill | |
| 6,044,375 A | 3/2000 | Shmueli | |
| 6,281,898 B1 * | 8/2001 | Nikolovska et al. | 715/848 |
| 6,311,194 B1 | 10/2001 | Sheth | |
| 6,735,518 B2 | 5/2004 | Kim | |
| 6,999,907 B2 | 2/2006 | Smith | |
| 7,212,322 B2 * | 5/2007 | Abhyankar et al. | 358/527 |
| 7,246,111 B1 * | 7/2007 | Chaware et al. | 707/718 |
| 7,739,304 B2 * | 6/2010 | Naaman et al. | 707/784 |
| 8,209,623 B2 * | 6/2012 | Barletta et al. | 715/776 |
| 2002/0073058 A1 * | 6/2002 | Kremer et al. | 707/1 |
| 2003/0078856 A1 | 4/2003 | Zubi | |
| 2004/0189695 A1 * | 9/2004 | Kurtz et al. | 345/738 |
| 2004/0225682 A1 * | 11/2004 | Murman et al. | 707/104.1 |
| 2006/0074869 A1 | 4/2006 | Cosatto | |
| 2006/0107234 A1 * | 5/2006 | Tudor et al. | 715/821 |
| 2006/0168514 A1 * | 7/2006 | Tokunaga | 715/513 |
| 2007/0016563 A1 * | 1/2007 | Omoigui | 707/3 |
| 2007/0016614 A1 * | 1/2007 | Novy | 707/104.1 |
| 2007/0033632 A1 * | 2/2007 | Baynger et al. | 725/135 |
| 2008/0195657 A1 * | 8/2008 | Naaman et al. | 707/104.1 |
| 2008/0263470 A1 * | 10/2008 | Murman et al. | 715/772 |

(Continued)

OTHER PUBLICATIONS

Kopetzky et al., "Visual Preview of Link Traversal on the World Wide Web." WWW 1999.

(Continued)

*Primary Examiner* — Stephen Hong
*Assistant Examiner* — Marshon Robinson
(74) *Attorney, Agent, or Firm* — Ryan, Mason & Lewis, LLP (57) ABSTRACT

Methods and systems are provided for automatic visual preview of non-visual data. A visual preview of non-visual data is generated by obtaining the non-visual data; obtaining metadata describing one or more semantic data types in the obtained non-visual data; selecting one or more visual metaphors for the obtained non-visual data based on the metadata; and generating the visual preview of the non-visual data using the one or more selected visual metaphors. As used herein, non-visual data does not have an established automatic method for generating a preview of the non-visual data. A user can optionally interact with the visual preview.

20 Claims, 6 Drawing Sheets

(56) References Cited

U.S. PATENT DOCUMENTS

| | | | | |
|---|---|---|---|---|
| 2009/0083652 | A1* | 3/2009 | Krasner et al. | 715/772 |
| 2009/0150353 | A1* | 6/2009 | Laakso et al. | 707/3 |
| 2009/0228448 | A1* | 9/2009 | Ivanov et al. | 707/3 |
| 2010/0100852 | A1* | 4/2010 | Buchanan | 715/854 |
| 2011/0197138 | A1* | 8/2011 | Mahmood et al. | 715/738 |

OTHER PUBLICATIONS

Derthick et al., "Example Based Generation of Custom Data Analysis Appliances", IUI 2001.

Dill et al., "SemTag and Seeker: Bootstrapping the Semantic Web Via Automated Semantic Annotation", WWW 2003.

Google Map. http://maps.google.com/.

Handschuh et al., "Annotation for the Semantic Web", IOS Press, 2003.

Jock Mackinlay, Automating the Design of Graphical Presentations of Relational Information, ACM Trans, Graph. 1986.

Roussopoulos et al., "Cubetree: Organizaiton of anad Bulk Incremental Updates on the Data", SIGMOD 1997.

Srinivasan et al., "What is in that Video Anyway?: In Search of Better Browsing", ICMCS 1999.

Teevan et al., "Personalizing Search Via Automated Analysis of Interests and Activities", SIGIR pp. 449-456 2005.

Yang et al., "Incremental Computation and Maintenance of Temporal Aggregates", VLDB 2003.

Mackinlay et al., "Show Me: Automatic Presentation for Visual Analysis", InfoVis 2007.

Michelle X. Zhou, "Visual Planning: A Practical Approach to Automated Presentation Design" In Proc of IJCAI '99, Stockholm, Sweden, Aug. 1999.

Zhou et al., "An Optimization-based Approach to Dynamic Data Content Selection in Intelligent Multimedia Interfaces", UIST 2004.

Geroimenko et al., "Visualizing the Semantic Web: XML-based Internet and Information Visualization", Springer 2003.

* cited by examiner

AUTOMATIC VISUAL PREVIEW OF NON-VISUAL DATA

FIELD OF THE INVENTION

The present invention relates to data visualization systems and, more particularly, relates to methods and apparatus for visualizing non-visual data.

BACKGROUND OF THE INVENTION

Interactive visual preview of data helps users to quickly identify data of interest in large and complex data sets. Visual preview of visual data, such as images, video and graphic files, has been widely used in many applications, including the Windows operating system from Microsoft Corp. For data that does not have an established visual representation (i.e., non-visual data), however, such as many forms of tabular and database data, visual preview of data is seldom used. Visualizing non-visual data requires users with visualization expertise to choose an appropriate interactive visual form. In addition, visualizing non-visual data requires an implementation that can ensure the necessary interactive speed for large data sets.

There is an increasingly large class of users, however, for whom automatic visual preview of non-visual data would be valuable. These users, often referred to as "everyday business users," typically have extensive domain knowledge but are typically not visualization or computer experts. Yet as part of their daily responsibilities, they perform situational analysis tasks over large amounts of non-visual data (such as sales data in a database). For such data, visual preview can be of great benefit for them to quickly browse data and find interesting content. It is difficult for everyday business users to create visual preview of data that is tailored to a user's context. A need therefore exists for automatic visual preview of non-visual data.

SUMMARY OF THE INVENTION

Generally, methods and systems are provided for automatic visual preview of non-visual data. According to one aspect of the invention, a visual preview of non-visual data is generated by obtaining the non-visual data; obtaining metadata describing one or more semantic data types in the obtained non-visual data; selecting one or more visual metaphors for the obtained non-visual data based on the metadata; and generating the visual preview of the non-visual data using the one or more selected visual metaphors. As used herein, non-visual data does not have an established automatic method for generating a preview of the non-visual data.

The obtained non-visual data can optionally be annotated using a set of semantic metadata types. In addition, a confidence of the annotation can optionally be estimated. An estimated annotation confidence can be used to rank visual metaphors.

An instantiated visual preview in accordance with an aspect of the invention allows a user to interact with the visual preview. An instantiated visualization can be modified by adjusting an appearance of an annotated version of the obtained non-visual data associated with a mapping confidence value below a predefined threshold, wherein the mapping confidence value estimates a confidence of the annotated version.

One or more values of the obtained non-visual data can optionally be mapped to values supported by a visualization. For example, the mapping can obtain one or more visualization examples and extracting visualization supported data values. Also, the mapping can calculate a semantic distance (i) between the values of annotated obtained non-visual data and values supported by the obtaining one or more visualization examples based on a statistical calculation of co-occurrence of value pairs; (ii) among values of annotated obtained non-visual data based on a statistical calculation of co-occurrence of value pairs; and/or (iii) among values supported by a visualization based on a geometric distance represented in the visualization.

The mapping optionally minimizes a weighted sum of (1) a semantic distance between a set of annotated obtained non-visual data and corresponding values supported by a visualization; and (2) a correlation between semantic distances among the annotated obtained non-visual data and semantic distances among corresponding visualization supported values. A mapping confidence of each value pair can be estimated based on a corresponding semantic distance after the minimization of the weighted sum.

According to further aspects of the invention, a visualization can be fed with data from a data structure containing an incrementally updated data summary; and the visual preview can be adapted to user interaction.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for automatic visual preview of non-visual data. According to one aspect of the invention, a method is provided for automatically creating visual preview of non-visual data by dynamically selecting an appropriate visual form based on context. As used herein, non-visual data comprises any data that does not have an established automatic method for producing a visualization or preview of the data. It is noted that non-visual data, such as a database, can have visual portions. According to another aspect of the invention, a method is provided for automatically creating a visual preview of non-visual data that achieves interactive speed by progressive data processing.

The present invention recognizes that there are a number of challenges to automatically generating an effective visual preview of non-visual data. First, it is not known how to visualize a data set a priori, because it depends on many contextual factors, such as data semantics and user intentions.

Second, most existing visualization tools are not designed to handle large amounts of data. Therefore, it could be time-consuming to create a visual preview for large data sets. Third, existing visualization tools usually support a particular set of values, such as geographical locations (coordinates or landmark name) and time data with a predefined format. In practice, however, data sets may refer to these values in many ways, such as partial geographical names (for example, "Main Street"). Therefore, it's difficult to directly use existing visualization tools to create visual preview.

Figure 1:
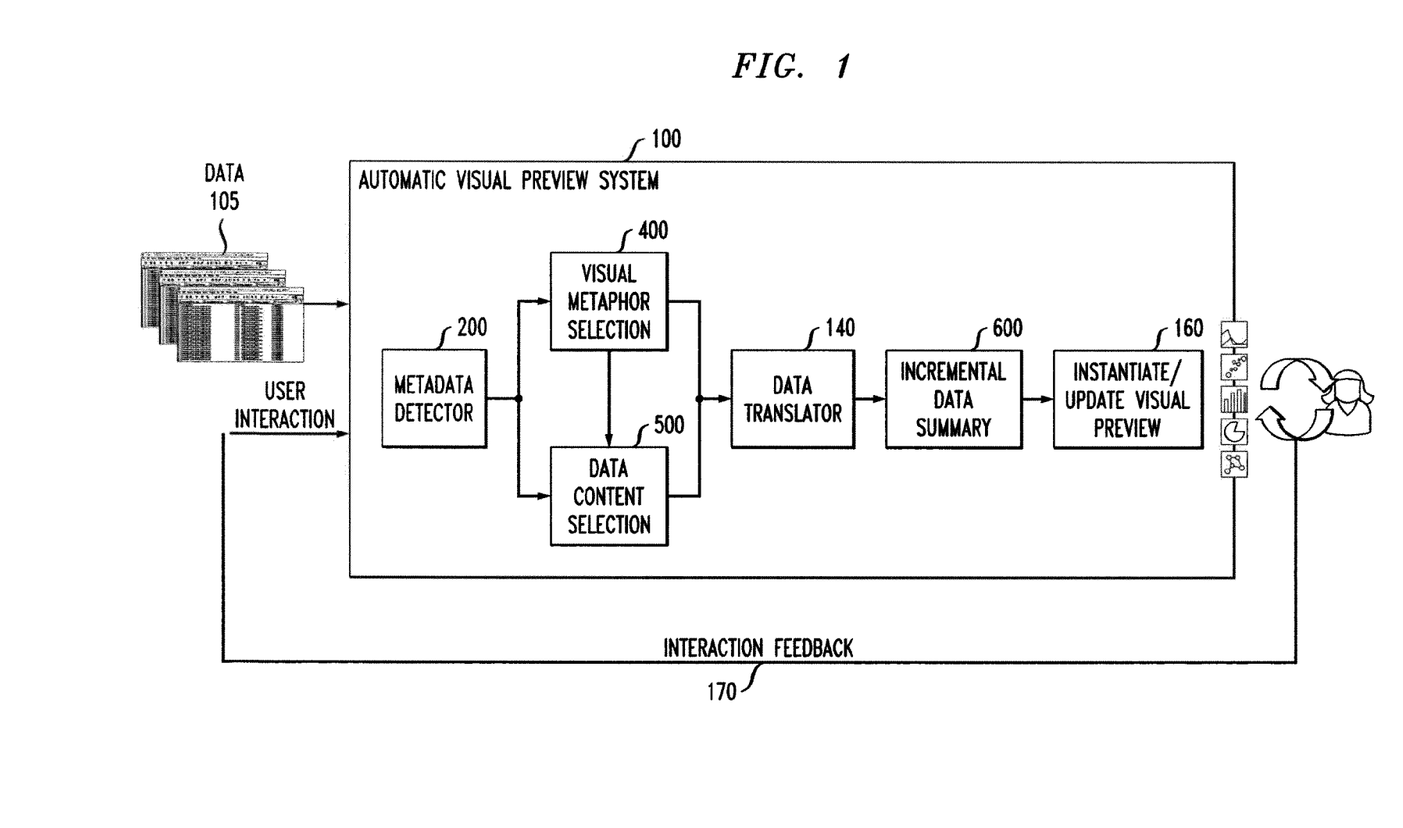
FIG. 1 illustrates an exemplary automatic visual preview system incorporating features of the present invention.

FIG. 1 illustrates an exemplary automatic visual preview system 100 incorporating features of the present invention. As shown in FIG. 1, and discussed further below, the exemplary automatic visual preview system 100 processes input data 105 using a metadata detector 200, a visual metaphor selection module 400, a data content selection module 500, a data translator 140, incremental data summary module 600 and a visual preview instantiation/update module 160. Each module in FIG. 1 is discussed further below in a corresponding subsection.

Generally, given an input data set, the automatic visual preview system 100 first detects the metadata (e.g., semantic data types) of the data set using the metadata detector 200. Thereafter, the visual metaphor selector 400 uses information visualization knowledge to automatically choose a set of appropriate visual metaphors to preview the data. Next, the data content selection module 500 decides the appropriate subset of data for each selected visual metaphor. For example, data with geographical information would be sent to a map metaphor. Then, the data translator 140 maps the values of the annotated input data to visualization supported values, such that the recommended visual metaphor can visualize the input data. Thereafter, a data summarization module 600 incrementally builds a data summary based on the data complexity and the speed requirement for interaction. Finally, the selected set of visual metaphors is instantiated based on current data summary by the visual preview instantiation/update module 160.

According to a feedback aspect of the invention, as users interact with the visual previews (e.g., zoom in on a visual metaphor or change the view from one metaphor to another), the system 100 attempts to adapt the visual preview to the current context of the user. For example, the incremental data summary module 600 will include more details in the region where users have zoomed in.

Data Translator Module 140

As previously indicated, existing visualization tools usually support a particular set of values, such as geographical locations (coordinates or landmark name) and time data with a predefined format. In practice, however, data sets may refer to these values in many ways, such as partial geographical names (for example, "Main Street"). Thus, the present invention employs a data translator module 140 that translates the annotated input data into a format that is supported by the visualization components.

For the data translator module 140, let s denote a symbol in the annotated input data (e.g., "Main St." in an input document), v denote a symbol supported by a visualization (e.g., "White Plains, N.Y." for a map). For s, let b(s) denote the best visualization supported symbol corresponding to s. For two visualization supported symbols $v_1$ and $v_2$, $D_m(v_1, v_2)$ measures the distance between their rendered position in the visualization (e.g., the distance between two locations on a map). In addition, $D_c(s, v)$ denotes the semantic distance between s and r and measured by their co-occurrences in all available data sources (e.g., the World Wide Web). Finally, for two symbols of the annotated input data $s_1$ and $s_2$, the semantic distance between them $D_d(s_1, s_2)$ is measured by their co-occurrences in the input data. All the distance values are normalized to [0, 1] in the exemplary embodiment.

The data translator module 140 assigns the best visualization supported symbol b(s) for each annotated input data value s, such that the objective function defined in Equation 1 is minimized:

$$\sum_{i=1}^{N} \left\{ D_c(s_i, b(s_i)) + \sum_{j=1}^{N} [1 - \cos(D_m(b(s_i), b(s_j)), D_d(s_i, s_j))] \right\} \quad (1)$$

Here, $\cos(D_m, D_d)$ is the correlation between $D_m$ and $D_d$ computed by the cosine distance function. As illustrated by Equation 1, the data translator module 140 minimizes the semantic distance between $s_i$ and $b(s_i)$ (i=1, ..., N). In addition, the data translator module 140 maximizes the correlation between the distances among the annotated input data values and the distances among the visualization supported values. For example, for the elements in Set 1, if the distance between $s_1$ and $s_2$ is small, the distance between their matches $b(s_1)$ and $b(s_2)$ should also be small.

For exemplary real estate sales data, partial geographical location names (e.g., town names) can be mapped to full geographic location names (e.g., with state and country names) that are understood by a map visualization.

Visual Preview Instantiation/Update Module 160

Generally, as discussed further below, the visual preview instantiation/update module 160 instantiates a visualization based on a chosen visualization type and a continuously updated stream of input data summary. Then, the visual preview instantiation/update module 160 continuously updates the visualization based on the updated data summary. The instantiated visual preview supports a set of user interactions such as zoom and/or change view.

Metadata Detector 200

The present invention recognizes that the metadata detected by existing technologies may not be suitable for visualization. For example, a given visualization may have requirements for the type of metadata. For example, a location detector may output data in the form of longitude/latitude values, but a map visualization may require landmark names. In addition, a visualization system may have requirements for the type of accuracy, such as wrong locations making a map illegible. Thus, it may be difficult to match existing visualization implementations with existing metadata detectors.

Figure 2:
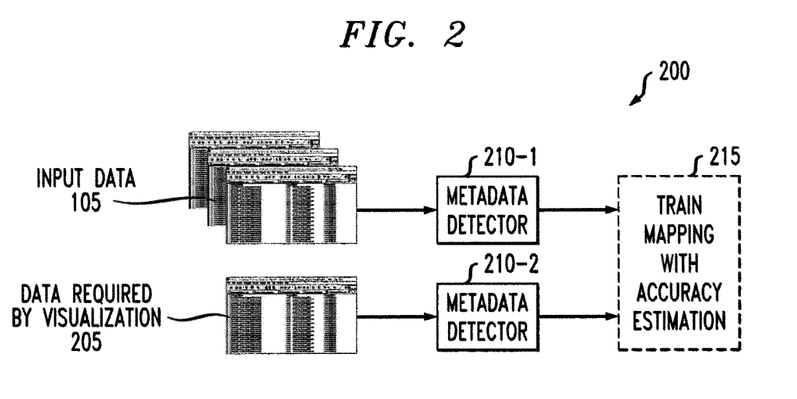
FIG. 2 illustrates an exemplary technique for training the metadata detector of FIG. 1 in further detail.

FIG. 2 illustrates an exemplary technique for training the metadata detector 200 of FIG. 1 in further detail. Generally, the metadata detector 200 detects the metadata (e.g., semantic data types) of the data set 105. The exemplary metadata detector 200 can be based, for example, on the teachings of S. Dill et al., "SemTag and Seeker: Bootstrapping the Semantic Web Via Automated Semantic Annotation," World Wide Web (2003), incorporated by reference herein.

As shown in FIG. 2, the exemplary metadata detector 200 comprises a plurality of exemplary metadata detectors 210-1 and 210-2 that learn (during a training process) one or more mappings 215 between detectable metadata in the input data 105 and visualization requirements 205. In addition, the exemplary metadata detector 200 can optionally estimate the mapping accuracy.

Figure 3:
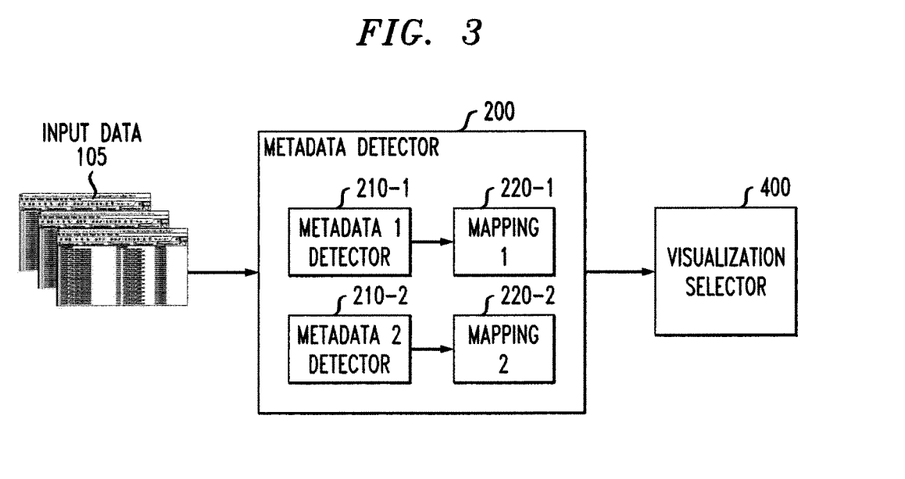
FIG. 3 illustrates an exemplary implementation of the metadata detector of FIGS. 1 and 2 in further detail.

FIG. 3 illustrates an exemplary implementation of the metadata detector 200 of FIGS. 1 and 2 in further detail. As shown in FIG. 3, the exemplary metadata detector 200 comprises a plurality of exemplary metadata detectors 210-1 and 210-2 to establish corresponding mappings 220-1 and 220-2 between detectable metadata in the data 105 and visualization requirements 205. As discussed further below in conjunction with FIG. 4, the metadata detector 200 feeds the mapped metadata and estimated accuracy into the visualization selection performed by the visual metaphor selection module 400.

Visual Metaphor Selection Module 400

Figure 4:
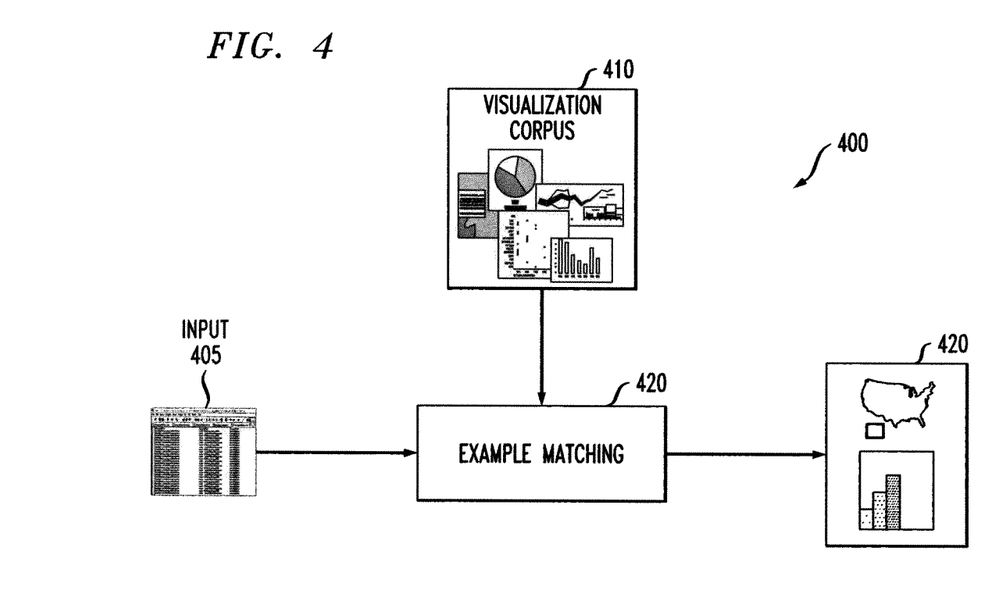
FIG. 4 illustrates an exemplary embodiment of the visual metaphor selection module of FIG. 1 in further detail.

FIG. 4 illustrates an exemplary embodiment of the visual metaphor selection module 400 of FIG. 1 in further detail. Generally, the visual metaphor selector 400 uses information visualization knowledge to automatically choose a set of appropriate visual metaphors to preview the data. The exemplary visual metaphor selection module 400 can be based, for example, on the teachings of M. X. Zhou and M. Chen, "Automated Generation of Graphic Sketches by Example," Proc. of IJCAI, 65-74 (2003) and/or V. Geroimenko and C. Chen, "Visualizing the Semantic Web: XML-Based Internet and Information Visualization," Springer (2003), each incorporated by reference herein.

As shown in FIG. 4, given the input data 405, the exemplary visual metaphor selection module 400 extracts a set of features that describe the data characteristics (e.g., data semantics). The visual metaphor selection module 400 then determines a measure of similarity between the input data 405 and the data in the one or more stored visualization examples 410. The similarity can measure, for example, whether the one or more stored visualization examples 410 are adequate for creating graphical illustrations for the input data 405. The best matching visualization examples 420 are chosen as the visual metaphor for the input data 405. For exemplary real estate sales data, where the detected data types are geographical data, time data and sales amount in dollar, the system 100 can select a map for geographic data, a line chart for time data, and a pie chart for the house category.

Data Content Selection Module 500

As previously indicated, the data content selection module 500 decides the appropriate subset of data for each selected visual metaphor. For example, data with geographical information would be sent to a map metaphor. The exemplary data content selection module 500 can be based, for example, on the teachings of M. Zhou and V. Aggarwal, "An Optimization-Based Approach to Dynamic Data Content Selection in Intelligent Multimedia Interfaces," UIST (2004), incorporated by reference herein.

Figure 5:
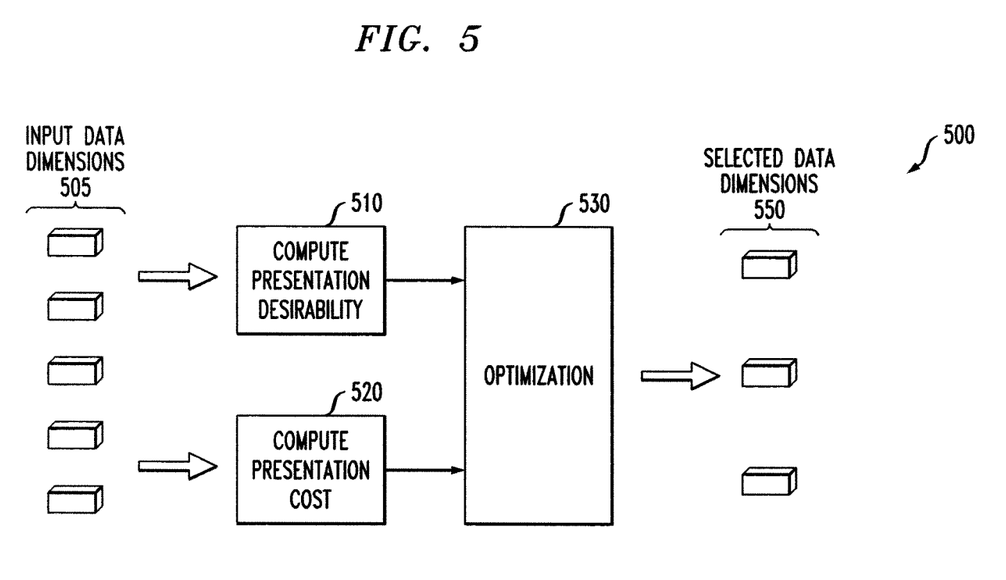
FIG. 5 illustrates an exemplary embodiment of the data content selection module of FIG. 1 in further detail.

FIG. 5 illustrates an exemplary embodiment of the data content selection module 500 of FIG. 1 in further detail. Generally, given the input data 505, as well as contextual factors (e.g., user interests), the exemplary data content selection module 500 determines data content suitable for generating a visualization. As shown in FIG. 5, the exemplary data content selection module 500 computes a presentation desirability and a presentation cost at stages 510 and 520, respectively. The data content determination can be modeled as an optimization operation at stage 530 that attempts to balance context-based selection constraints. That is, the optimization operation 530 maximizes the presentation desirability computed at stage 510, such as matching user interests, while minimizing the presentation cost computed at stage 520, such as the display space needed for the visualization.

For the exemplary real estate sales data, house location, house price and house tax can be selected for generating a visualization.

Incremental Data Summary Module 600

As previously indicated, the data summarization module 600 incrementally builds a data summary based on the data complexity and the speed requirement for interaction. The exemplary incremental data summary module 600 can be based, for example, on the teachings of N. Roussopoulos et al., "Cubetree: Organization of and Bulk Incremental Updates on the Data," SIGMOD (1997) and/or J. Yang and J. Widom, "Incremental Computation and Maintenance of Temporal Aggregates," VLDB (2003), each incorporated by reference herein.

Figure 6:
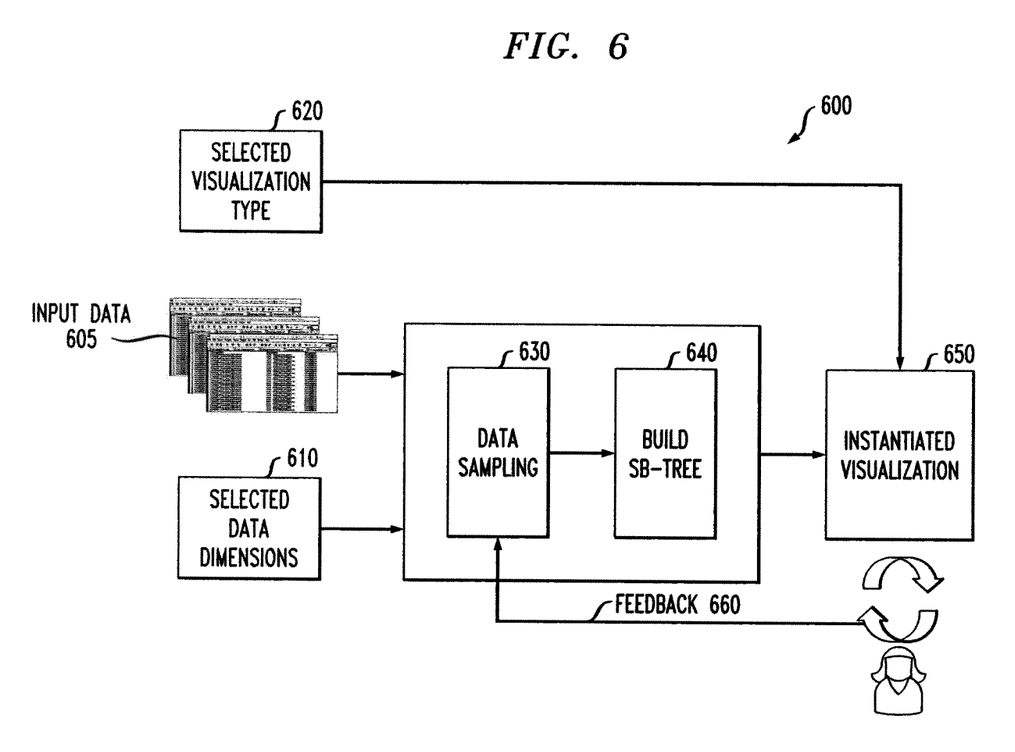
FIG. 6 illustrates an exemplary embodiment of the incremental data summary module of FIG. 1 in further detail.

FIG. 6 illustrates an exemplary embodiment of the incremental data summary module 600 of FIG. 1 in further detail. As previously indicated, an aspect of the invention instantiates a visualization in real-time by performing a sampling (e.g., random sampling) of the input data 605 at stage 630, using the selected data dimensions 610. As shown in FIG. 6, the exemplary incremental data summary module 600 then builds a SB-tree data structure at stage 640 to summarize the sampled input data. Using the SB-tree, the number of records falling into a particular range can be easily looked up.

As users interact with the visualization instantiated by module 650, using the selected visualization type 620, this information is fed back to module 630 using feedback path 660. In this manner, module 630 can continue obtain more samples of input data for insertion into the SB-tree. Thus, the SB-tree can give more accurate data summary over time. Moreover, when user interactions indicate user interests over a subspace of the input data (e.g., zooming into a particular region of a map), module 630 can focus on sampling the subspace of interests. As a result, the data summary for this subspace can be more accurate.

For the exemplary real estate sales data, the incremental data summary module 600 decides the sampling parameters, based on speed requirements and data properties and then updates the data summary incrementally.

In this manner, the feedback path 660 allows the visual preview to be adapted to the user interaction. A user interest map on the data space is computed to prioritize the incremental update of the data summary. Specifically, $U=\{r_1, r_2, \ldots, r_M\}$ denotes a subspace of the M dimensional input data space, where $r_i$ is a range in the i-th dimension. Let K be the total number of user interactions with the visual preview, and $K_U$ be the number of user interactions fall into the visual area that corresponds to data sub space U. The user interest map of data sub space U is then $$I_d(U) = \frac{K_U}{K} \quad (2)$$

The interest map $I_d$ is then used to control the granularities levels of the data dimensions in the incremental update of cube. As a result, the visual preview can show more details for data ranges of user interest.

In addition, user preferences of different types of visual metaphors can be computed to adjust the rank of visual metaphors. Let V denote a user's total number of viewing of all types of visual metaphors, and $V_i$ denote the user's number of viewing of the i-th type of visual metaphor. A weight is computed for the i-th type of visual metaphor:

$$w_i = c \frac{V_i}{V} \quad (3)$$

where c is a constant to control how much user interaction can impact the visual metaphor ranking. The weight $w_i$ is then used to weight the ranking score of the i-th type of visual metaphor. In this way, the visual metaphor ranking can be adapted to user interactions.

Finally, user interests in different data are computed, for example, using the techniques of J. Teevan et al., "Personalizing Search Via Automated Analysis of Interests and Activities," SIGIR 449-456 (2005), incorporated by reference herein. The computed user interests in data can be then used in the data content selection module 500 to update the data content in the visual preview.

If a user zooms into a particular area in a map preview of sales data, the automatic visual preview system 100 can automatically include more details to update the data summary so that the user can see more information in the zoomed map preview. In addition, if the user accesses other data content (e.g., opens a spreadsheet of school information) while interacting with the visual preview, such data access interaction indicates the user's interests on data content related to schools. To tailor the visual preview to the users' data interests, the system 100 adapts the data content selection module 500 to include school information in the visual preview.

Further, if the user often changes the view from a pie chart view to a bar chart to view information, it suggests the user's preference of using a bar chart over a pie chart. To tailor the visual preview to the users' preferences, the system 100 adapts the incremental data summary module 600.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
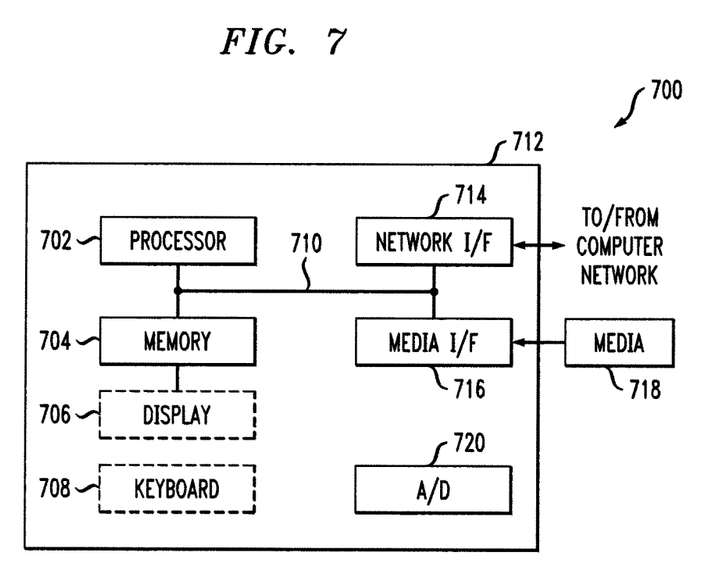
FIG. 7 depicts a computer system that may be useful in implementing one or more aspects and/or elements of the present invention.

One or more embodiments can make use of software running on a general purpose computer or workstation. FIG. 7 depicts a computer system 700 that may be useful in implementing one or more aspects and/or elements of the present invention. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Analog-to-digital converter(s) 720 may be provided to receive analog input, such as analog video feed, and to digitize same. Such converter(s) may be interconnected with system bus 710.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is anon-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 702. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a visual summary of non-visual data, said method comprising:
   obtaining said non-visual data;
   obtaining metadata describing one or more data types in said obtained non-visual data suitable for a visual summary of said non-visual data, wherein said obtaining metadata comprises:
      detecting one or more items of metadata in the non-visual data that correspond to one or more items of metadata present in at least one established mapping between metadata and one or more visual summary requirements of at least one given visualization type; and
      estimating a measure of accuracy between the one or more detected items of metadata and the one or more items of metadata present in the at least one established mapping;
   selecting multiple visual metaphors for said obtained non-visual data based on said metadata and said measure of accuracy, wherein each of said multiple visual metaphors comprises a stored visual representation, and wherein said selecting comprises selecting, for each of one or more sub-sets of the non-visual data, the stored visual representation having the highest similarity measure in connection with a set of characteristics of the sub-set of the non-visual data derived from said metadata;
   generating said visual summary of said non-visual data by instantiating a combination of said multiple selected visual metaphors;
   instantiating said visual summary to allow a user to interact with said visual summary, wherein said instantiating comprises adjusting an appearance of an annotated version of said obtained non-visual data associated with a mapping confidence value below a predefined threshold, wherein said mapping confidence value estimates a confidence of said annotated version; and
   mapping one or more values of the obtained non-visual data to values supported by a visualization, wherein said mapping comprises calculating a semantic distance between (i) one or more values of an annotated version of the obtained non-visual data and (ii) one or more values supported by one or more visualization examples based on a statistical calculation of co-occurrence of value pairs.

2. The method of claim 1, wherein said non-visual data does not have an established automatic method for generating a summary of said non-visual data.

3. The method of claim 1, wherein said step of obtaining metadata further comprises the step of annotating said obtained non-visual data using a set of semantic metadata types.

4. The method of claim 3, wherein said step of annotating said obtained non-visual data further comprises of the step of estimating a confidence of said annotation.

5. The method of claim 1, wherein the step of selecting multiple visual metaphors further comprises the step of incorporating an estimated annotation confidence to rank visual metaphors.

6. The method of claim 1, wherein said mapping one or more values of the obtained non-visual data further comprises the step of obtaining one or more visualization examples and extracting visualization supported data values.

7. The method of claim 1, wherein said mapping one or more values of the obtained non-visual data further comprises the step of calculating a semantic distance among values of annotated obtained non-visual data based on a statistical calculation of co-occurrence of value pairs.

8. The method of claim 1, wherein said mapping one or more values of the obtained non-visual data further comprises the step of calculating a semantic distance among values supported by a visualization based on a geometric distance represented in said visualization.

9. The method of claim 1, wherein said mapping one or more values of the obtained non-visual data further comprises the step of minimizing a weighted sum of (i) a semantic distance between a set of annotated obtained non-visual data and corresponding values supported by a visualization; and (ii) a correlation between semantic distances among the annotated obtained non-visual data and semantic distances among corresponding visualization supported values.

10. The method of claim 9, wherein said mapping one or more values of the obtained non-visual data further comprises the step of estimating a mapping confidence of each value pair based on a corresponding semantic distance after said minimization of said weighted sum.

11. The method of claim 1, further comprising the step of feeding a visualization with data from a data structure containing an incrementally updated data summary.

12. The method of claim 1, further comprising of the step of adapting said visual summary to user interaction.

13. The method of claim 12, wherein the step of adapting said visual summary to user interaction further comprises the step of adapting an incremental update of data summary to include additional details corresponding to user interests indicated by said user interaction.

14. The method of claim 12, wherein the step of adapting said visual summary to user interaction further comprises the step of adapting a data content selection to create a visual summary for data corresponding to user interests indicated by a user interaction history with one or more applications.

15. The method of claim 12, wherein the step of adapting said visual summary to user interaction further comprises the step of adapting a visual metaphor ranking to user preferences on different types of visual metaphor indicated by a user interaction history with said visual summary.

16. An article of manufacture for generating a visual preview of non-visual data, said article of manufacture comprising a non-transitory computer readable storage medium containing one or more programs which when executed implement the steps of:
   obtaining said non-visual data;
   obtaining metadata describing one or more data types in said obtained non-visual data suitable for a visual summary of said non-visual data, wherein said obtaining metadata comprises:

detecting one or more items of metadata in the non-visual data that correspond to one or more items of metadata present in at least one established mapping between metadata and one or more visual summary requirements of at least one given visualization type; and estimating a measure of accuracy between the one or more detected items of metadata and the one or more items of metadata present in the at least one established mapping;

selecting multiple visual metaphors for said obtained non-visual data based on said metadata and said measure of accuracy, wherein each of said multiple visual metaphors comprises a stored visual representation, and wherein said selecting comprises selecting, for each of one or more sub-sets of the non-visual data, the stored visual representation having the highest similarity measure in connection with a set of characteristics of the sub-set of the non-visual data derived from said metadata;

generating said visual summary of said non-visual data by instantiating a combination of said multiple selected visual metaphors;

instantiating said visual summary to allow a user to interact with said visual summary, wherein said instantiating comprises adjusting an appearance of an annotated version of said obtained non-visual data associated with a mapping confidence value below a predefined threshold, wherein said mapping confidence value estimates a confidence of said annotated version; and mapping one or more values of the obtained non-visual data to values supported by a visualization, wherein said mapping comprises calculating a semantic distance between (i) one or more values of an annotated version of the obtained non-visual data and (ii) one or more values supported by one or more visualization examples based on a statistical calculation of co-occurrence of value pairs.

17. The article of manufacture of claim 16, wherein said non-visual data does not have an established automatic system for generating a summary of said non-visual data.

18. The article of manufacture of claim 16, further comprising the step of instantiating said visual summary to allow a user to interact with said visual summary.

19. The article of manufacture of claim 16, further comprising the step of feeding a visualization with data from a data structure containing an incrementally updated data summary.

20. A system for generating a visual summary of non-visual data, said system comprising:

a memory; and at least one processor, coupled to the memory, operative to:
  obtain said non-visual data;
  obtain metadata describing one or more data types in said obtained non-visual data suitable for a visual summary of said non-visual data, wherein said obtaining metadata comprises:
    detecting one or more items of metadata in the non-visual data that correspond to one or more items of metadata present in at least one established mapping between metadata and one or more visual summary requirements of at least one given visualization type; and
    estimating a measure of accuracy between the one or more detected items of meta data and the one or more items of metadata present in the at least one established mapping;
  select multiple visual metaphors for said obtained non-visual data based on said metadata and said measure of accuracy, wherein each of said multiple visual metaphors comprises a stored visual representation, and wherein said selecting comprises selecting, for each of one or more sub-sets of the non-visual data, the stored visual representation having the highest similarity measure in connection with a set of characteristics of the sub-set of the non-visual data derived from said metadata;
  generate said visual summary of said non-visual data by instantiating a combination of said multiple selected visual metaphors;
  instantiate said visual summary to allow a user to interact with said visual summary, wherein said instantiating comprises adjusting an appearance of an annotated version of said obtained non-visual data associated with a mapping confidence value below a predefined threshold, wherein said mapping confidence value estimates a confidence of said annotated version; and
  map one or more values of the obtained non-visual data to values supported by a visualization, wherein said mapping comprises calculating a semantic distance between (i) one or more values of an annotated version of the obtained non-visual data and (ii) one or more values supported by one or more visualization examples based on a statistical calculation of co-occurrence of value pairs.

* * * * *